US009947995B2

(12) United States Patent
Nakano et al.

(10) Patent No.: US 9,947,995 B2
(45) Date of Patent: Apr. 17, 2018

(54) ANTENNA DEVICE, FEED ELEMENT, AND COMMUNICATION TERMINAL DEVICE

(71) Applicant: Murata Manufacturing Co., Ltd., Nagaokakyo-shi, Kyoto-fu (JP)

(72) Inventors: Shinichi Nakano, Nagaokakyo (JP); Kuniaki Yosui, Nagaokakyo (JP); Noboru Kato, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 15/272,684

(22) Filed: Sep. 22, 2016

(65) Prior Publication Data

US 2017/0012350 A1  Jan. 12, 2017

Related U.S. Application Data

(63) Continuation of application No. 14/221,437, filed on Mar. 21, 2014, now Pat. No. 9,531,072, which is a
(Continued)

(30) Foreign Application Priority Data

Jun. 28, 2012 (JP) ................... 2012-144968
Sep. 14, 2012 (JP) ................... 2012-202755
Oct. 12, 2012 (JP) ................... 2012-226975

(51) Int. Cl.
*H01Q 1/48* (2006.01)
*H01Q 1/24* (2006.01)
(Continued)

(52) U.S. Cl.
CPC ......... *H01Q 1/243* (2013.01); *G06K 7/10009* (2013.01); *H01Q 1/48* (2013.01); *H01Q 7/00* (2013.01); *H01Q 7/06* (2013.01)

(58) Field of Classification Search
CPC ........... H01Q 1/243; H01Q 1/48; H01Q 7/00; H01Q 7/06
(Continued)

(56) References Cited

U.S. PATENT DOCUMENTS

2007/0115197 A1* 5/2007 Nakamura ........... H01Q 1/2283
                                                    343/788
2012/0001701 A1* 1/2012 Taniguchi ............ G06K 7/0008
                                                    333/5
2012/0274431 A1* 11/2012 Kato ................... H01P 1/20345
                                                    336/182

FOREIGN PATENT DOCUMENTS

GB      2 348 321 A      9/2000
WO   2005/043566 A1     5/2005
(Continued)

OTHER PUBLICATIONS

Nakano et al., "Antenna Device, Feed Element, and Communication Terminal Device", U.S. Appl. No. 14/221,437, filed Mar. 21, 2014.
(Continued)

*Primary Examiner* — Andrea Lindgren Baltzell
(74) *Attorney, Agent, or Firm* — Keating & Bennett, LLP

(57) ABSTRACT

An antenna device includes a conductor surface in which an opening having an open edge portion in communication with the outside is provided, a feed element including a first coil connected to the feed element and a second coil magnetically coupled to the first coil, a first mounting portion disposed in the open edge portion and connected to a first end of the second coil, and a second mounting portion disposed in the open edge portion in a state isolated from the first mounting portion and connected to a second end of the second coil. The first mounting portion and the conductor surface are directly or indirectly conducted to each other, and the second mounting portion and the conductor surface are directly or indirectly conducted to each other. A loop is
(Continued)

defined around the opening through the first mounting portion, the second mounting portion, and the second coil.

13 Claims, 14 Drawing Sheets

Related U.S. Application Data continuation of application No. PCT/JP2013/067805, filed on Jun. 28, 2013.

(51) Int. Cl.
  *H01Q 7/00* (2006.01)
  *G06K 7/10* (2006.01)
  *H01Q 7/06* (2006.01)

(58) Field of Classification Search
  USPC .................................................... 343/702
  See application file for complete search history.

(56) References Cited

FOREIGN PATENT DOCUMENTS

| WO | 2011/090082 | A1 | 7/2011 | |
| WO | WO2011090082 | * | 7/2011 | ............... H01Q 1/24 |

OTHER PUBLICATIONS

Nakano, S. et al.; "Antenna Device and Communication Terminal Device"; U.S. Appl. No. 14/219,172, filed Mar. 19, 2014.

Nakano, S. et al.; "Antenna Device and Communication Terminal Device"; U.S. Appl. No. 14/749,879, filed Jun. 25, 2015.

Official Communication issued in corresponding United Kingdom Application No. 1701500.9, dated Feb. 22, 2017.

\* cited by examiner

ANTENNA DEVICE, FEED ELEMENT, AND COMMUNICATION TERMINAL DEVICE

BACKGROUND OF THE INVENTION

1. Field of the Invention

The present invention relates to an antenna device, a feed element, and a communication terminal device, which are used in communication systems of HF-bands and UHF-bands.

2. Description of the Related Art

In 13.56 MHz-band RFID installed in a cellular phone terminal and employed for, e.g., NFC (Near Field Communication), an RFID IC chip and a matching element are generally mounted on a printed wiring board in many cases, and an antenna is affixed to the inner side of a terminal casing. Furthermore, the RFID IC chip and the antenna are electrically connected (DC-connected) through a spring pin, for example. However, such a connection method has the problem that a contact failure may occur due to friction in a contact portion or a positional deviation caused in assembly.

In view of the above-mentioned problem, a reader/writer is disclosed which has a structure including an antenna substrate on which a loop antenna is disposed, and a control substrate on which a transmitting and receiving circuit is disposed (see Japanese Patent No. 4325621). In the structure disclosed in Japanese Patent No. 4325621, a coil disposed on the control substrate and the loop antenna are magnetically coupled to each other to establish electrical connection of the loop antenna with the transmitting and receiving circuit. As a result, a physical contact portion is not present, and the occurrence of a contact failure can be avoided.

In the structure disclosed in Japanese Patent No. 4325621, however, because of utilizing the magnetic coupling, a coupling degree changes due to a variation in the mounted position of the coil, and the distance between a surrounding component and the coil varies due to a variation in the mounted position of the coil, whereby a value of stray capacitance generated between the surrounding component and the coil is changed. This causes a problem that antenna characteristics vary.

SUMMARY OF THE INVENTION

Preferred embodiments of the present invention provide an antenna device, a feed element, and a communication terminal device including the antenna device and the feed element, which reduces or prevents a variation in the coupling degree, and which prevents the problem of interference with surrounding components and other problems.

According to a preferred embodiment of the present invention, an antenna device includes a conductor member and a feed element that feeds a high-frequency signal to the conductor member, wherein the feed element includes a first coil connected to a feed circuit, a second coil magnetically coupled to the first coil, and two terminal electrodes that connect the second coil to the conductor member, the first coil, the second coil, and the two terminal electrodes being integrally provided with an insulating stacked body.

Preferably, the feed element includes a capacitor connected between at least one of the two terminal electrodes and at least one of terminals of the second coil.

Preferably, the conductor member is a conductor film provided with a substrate that includes a terminal to which at least one of the two terminal electrodes of the feed element is connected, and a capacitor connected between the relevant one terminal and the conductor member.

Preferably, the conductor member, the capacitor, the first coil constitute a resonance circuit.

Preferably, a capacitance of the capacitor and an inductance of the first coil are determined such that a resonance frequency of the resonance circuit is a communication frequency or close to the communication frequency.

Preferably, an inductance of the second coil is smaller than an inductance component of the conductor member, the inductance component being determined when looking from the two terminal electrodes.

Preferably, the conductor member includes a slit or an opening that spans from an edge to an inner side of the conductor member, and the two terminal electrodes are arranged at positions on both sides across the slit or the opening.

Preferably, the feed element has a stacked structure including a plurality of stacked insulator layers with which conductors defining the first coil and the second coil are provided.

Preferably, the feed element includes a plurality of insulator layers with which conductors defining the first coil and the second coil are provided, and a plurality of insulator layers with which conductors defining the capacitor are provided.

Preferably, the conductor film is a ground electrode or a shield electrode of a circuit provided on the substrate.

Preferably, the feed circuit includes an RFIC, and the RFIC is mounted on the insulating stacked body.

Preferred embodiments of the present invention provide a feed element used to constitute an antenna device in cooperation with a conductor member, wherein the feed element includes an insulating stacked body, a first coil connected to a feed circuit, a second coil magnetically coupled to the first coil, and two terminal electrodes that connect the second coil to the conductor member, the first coil, the second coil, and the two terminal electrodes being integrally provided with the insulating stacked body.

According to another preferred embodiment of the present invention, a communication terminal device includes an antenna device and a feed circuit connected to the antenna device, wherein the antenna device includes a conductor member and a feed element that feeds a high-frequency signal to the conductor member, the feed element includes a first coil connected to the feed circuit, a second coil magnetically coupled to the first coil, and two terminal electrodes that connect the second coil to the conductor member, the first coil, the second coil, and the two terminal electrodes being integrally provided with an insulating stacked body.

According to various preferred embodiments of the present invention, since the first coil and the second coil are magnetically coupled to each other with the feed element in the insulating stacked body, an influence caused by magnetic coupling to the outside of the feed element is significantly reduced or prevented in comparison with the case of developing magnetic coupling between different members. Furthermore, since the magnetic coupling is developed by using one insulating stacked body, a coupling degree is not changed depending on a variation in mounting of the feed element, and a variation in antenna characteristics attributable to change of the coupling degree is prevented and significantly reduced.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
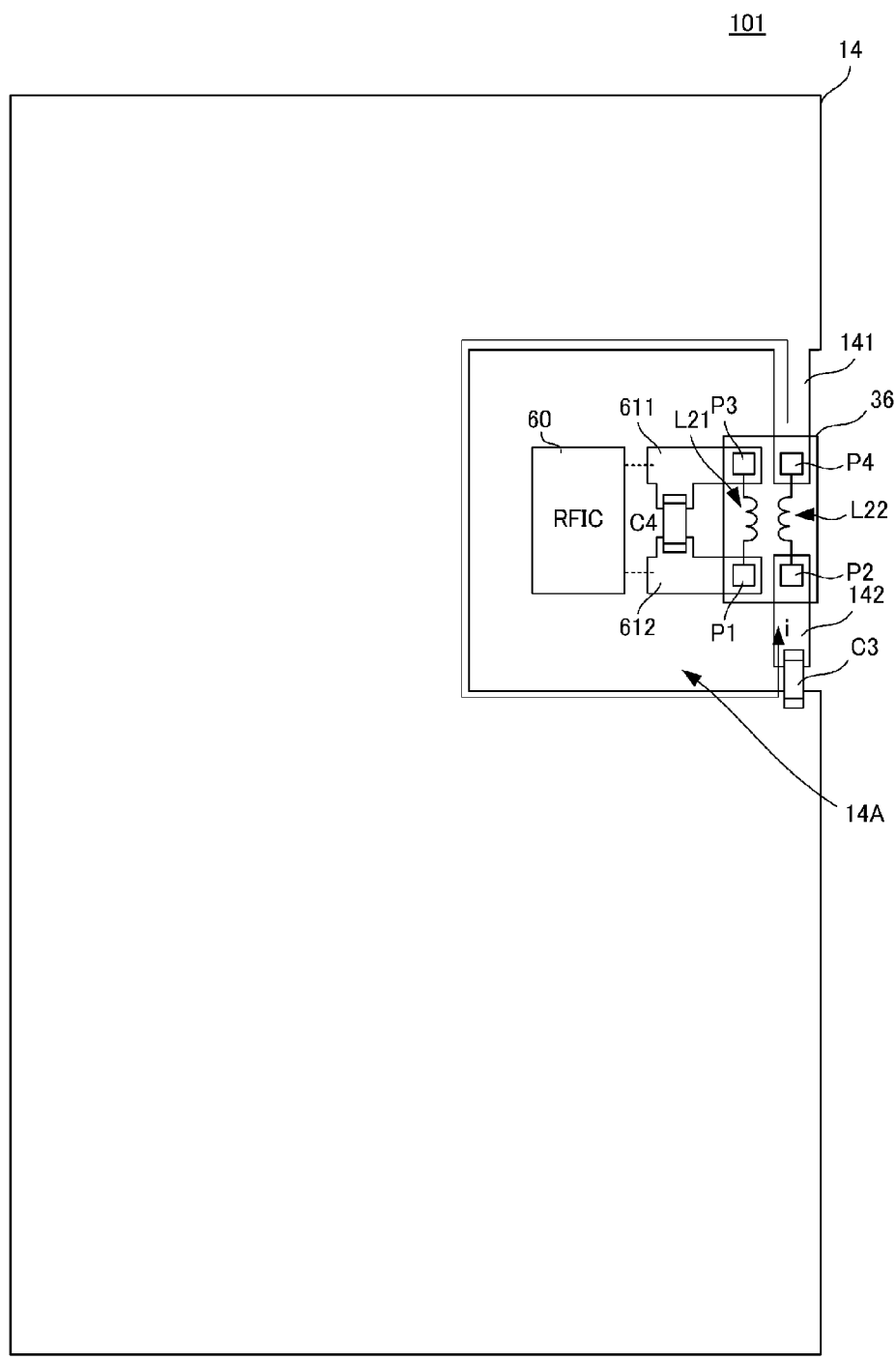
FIG. 1 is a plan view of an antenna device 101 according to a first preferred embodiment of the present invention.

Preferred embodiments of the present invention will be described below in connection with several practical examples by referring to the drawings. Through the drawings, the same constituent elements are denoted by the same reference signs. It is as a matter of course that the following preferred embodiments are merely illustrative, and that partial replacement or combination of individual configurations described in the different preferred embodiments may be practiced as required.

Antenna devices according to the several preferred embodiments described below are each an antenna device that transmits and receives a high-frequency signal in a HF-band (e.g., 13.56 MHz band), which is incorporated in a communication terminal represented by a smartphone and a tablet terminal.

First Preferred Embodiment

FIG. 1 is a plan view of an antenna device 101 according to a first preferred embodiment of the present invention.

Figure 2:
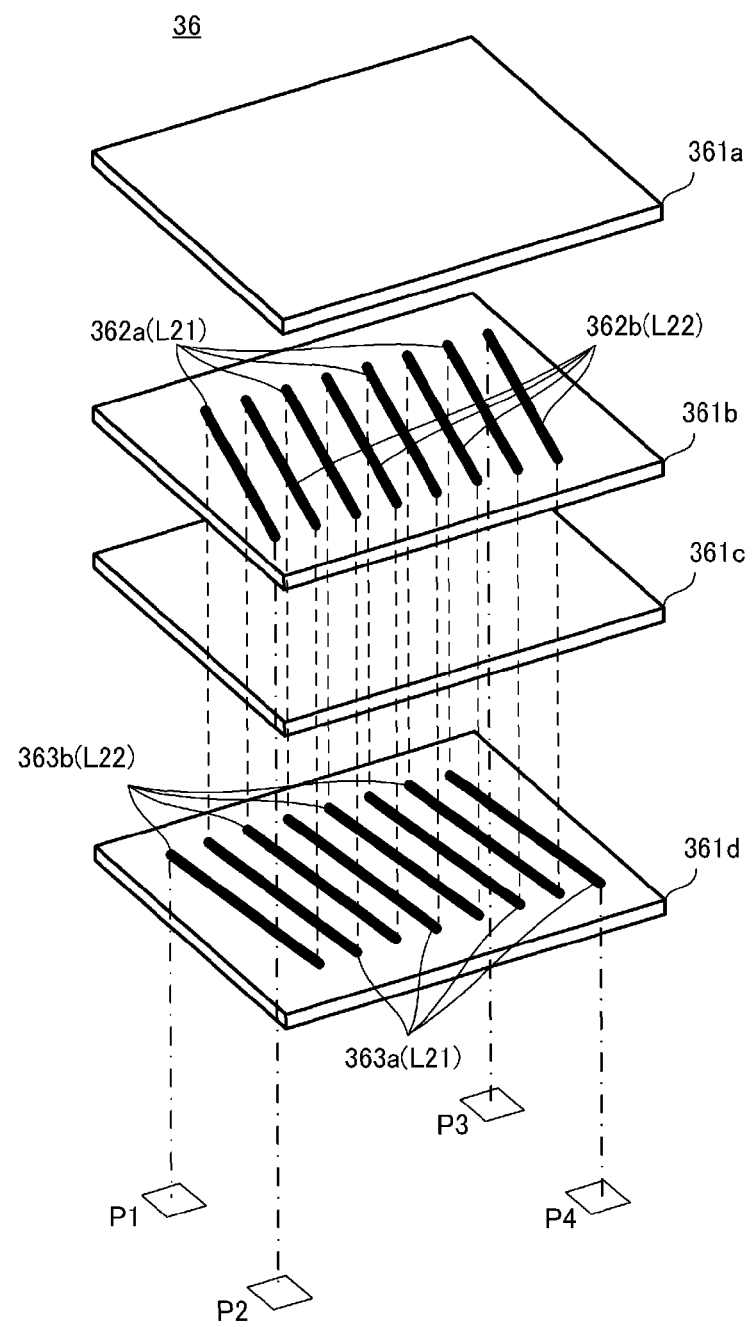
FIG. 2 is an exploded perspective view of a feed element 36 according to the first preferred embodiment of the present invention.
Figure 3:
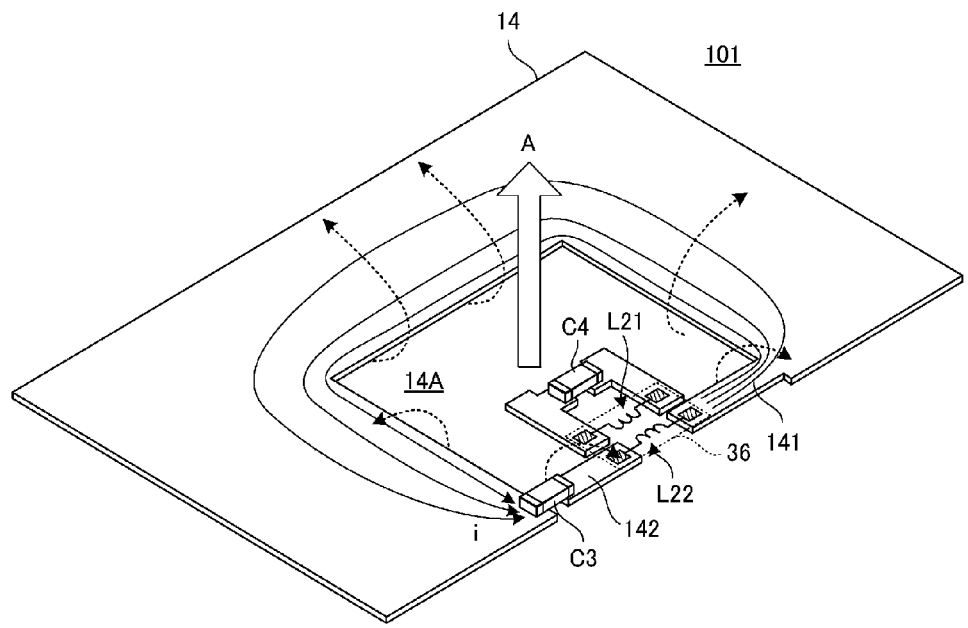
FIG. 3 is an illustration to explain radiation of a magnetic field in the antenna device 101 according to the first preferred embodiment of the present invention.

FIG. 2 is an exploded perspective view of a feed element 36 according to the first preferred embodiment. FIG. 3 is an illustration to explain radiation of a magnetic field in the antenna device 101 according to the first preferred embodiment. In FIGS. 1 and 3, the feed element 36 is illustrated in an external shape, and a first coil L21 and a second coil L22 both incorporated in the feed element 36 are denoted by circuit symbols.

The antenna device 101 includes a conductor surface 14 serving as a conductor member. A rectangular or substantially rectangular opening 14A is provided in the conductor surface 14. The conductor surface 14 is, e.g., a ground conductor pattern provided on a circuit board, and the opening 14A corresponds to, e.g., a non-conductor portion of the circuit board in which the ground conductor pattern is not provided. Furthermore, the opening 14A is not a closed opening, and it has an open edge portion that is arranged to be communicated with the outside of the conductor surface 14. A first mounting portion 141 and a second mounting portion 142, which are used to mount the feed element 36, are provided in the open edge portion.

The first mounting portion 141 is directly connected to the conductor surface 14. The first mounting portion 141 may be integral with the conductor surface 14, or may be a member that is separate from the conductor surface 14 and that is connected to the conductor surface 14 by, e.g., a connecting component, such as a wire or a chip inductor. The second mounting portion 142 is isolated from both the conductor surface 14 and the first mounting portion 141, and is connected to the conductor surface 14 through a capacitor C3.

The feed element 36 includes, described in detail later, the first coil L21 and the second coil L22 that are mainly coupled to each other through a magnetic field. A first end of the second coil L22 is connected to the first mounting portion 141, and a second end of the second coil L22 is connected to the second mounting portion 142. With such an arrangement, the open edge portion of the opening 14A is closed by the capacitor C3, the second coil L22, and so on, such that a peripheral edge of the opening 14A constitutes a loop. An inductance component of the loop, the capacitor C3, and the second coil L22 define a resonance circuit.

Alternatively, the first mounting portion 141 may be connected to the conductor surface 14 through a capacitor. A resonance frequency of the resonance circuit provided as mentioned above can be adjusted with the provision of such a capacitor.

As illustrated in FIG. 2, the feed element 36 is a component in the form of an insulating stacked body, and has a stacked structure in which a plurality of insulator layers 361a, 361b, 361c and 361d are stacked one above another. In more detail, the insulator layers 361a and 361d are nonmagnetic layers formed of nonmagnetic ferrite sheets, for example, and the insulator layers 361b and 361c are magnetic layers defined by magnetic ferrite sheets, for example. The feed element 36 includes the first coil L21 and the second coil L22 that are magnetically coupled to each other. Coil conductor patterns 362a and 362b defining the first coil L21 are located on the magnetic layer 361b, and coil conductor patterns 363a and 363b defining the second coil L22 are provided on the insulator layer 361d. The coil conductor patterns 362a and 362b and the coil conductor patterns 363a and 363b are arranged such that coil winding axes thereof are each oriented perpendicular or substantially perpendicular to the direction in which the insulator layers are stacked.

More specifically, the coil conductor patterns 362a and 362b each having a linear shape are alternately provided on the magnetic layer 361b, and the coil conductor patterns 363a and 363b each having a linear shape are alternately provided on the insulator layer 361d. Moreover, via conductors interconnecting the coil conductor patterns 362a and 362b and the coil conductor patterns 363a and 363b, respectively, are provided on the magnetic layers 361b and 361c. With the arrangement described above, the first coil L21 and the second coil L22 are configured such that respective coil openings are matched with each other.

Terminal electrodes P1, P2, P3 and P4 are provided on a lower surface of the insulator layer 361d. The terminal electrode P1 is connected to one end of outermost one of the coil conductor patterns 363b through the via conductor. The terminal electrode P2 is connected to one end of outermost one of the coil conductor patterns 362a through the via conductor. The terminal electrode P3 is connected to one end of outermost one of the coil conductor patterns 362b through the via conductor. The terminal electrode P4 is connected to one end of outermost one of the coil conductor patterns 363a through the via conductor.

Although FIG. 2 illustrates an example including two magnetic layers, a larger number of magnetic layers may be stacked. For example, the magnetic layer 361c may be stacked in plural number.

As seen from FIG. 1, feed-circuit side mounting portions 611 and 612 are disposed in the opening 14A and are connected to a first end and a second end of the first coil L21, respectively. A capacitor C4 is connected between the feed-circuit side mounting portions 611 and 612. Moreover, an RFIC 60 is connected to the feed-circuit side mounting portions 611 and 612. The RFIC 60 defines a feed circuit. The RFIC 60 is preferably constituted as a semiconductor chip component.

The first coil L21 and the second coil L22 of the feed element 36 are magnetically coupled to each other. Because the feed circuit is connected to the first coil L21, a current i flows along the loop around the opening 14A, as illustrated in FIGS. 1 and 3, through the magnetic coupling between the two coils L21 and L22. With the current i flowing around the opening 14A, the opening 14A acts as a radiation portion, as illustrated in FIG. 3. Accordingly, the antenna device 101 has directivity in a direction denoted by an arrow A in FIG. 3.

Figure 4:
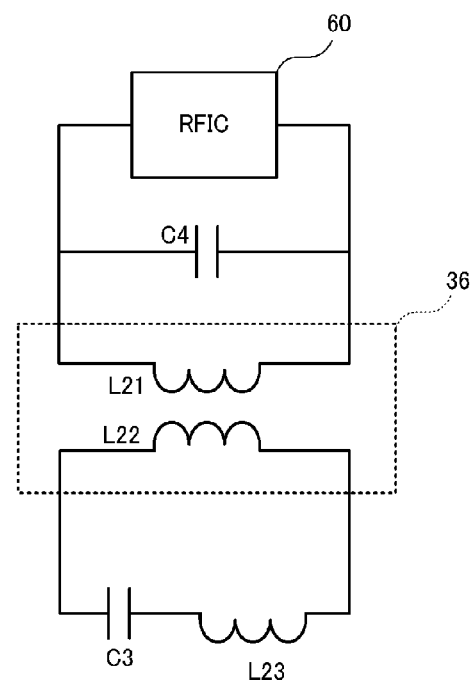
FIG. 4 is an equivalent circuit diagram of the antenna device 101, including a feed circuit as well.

FIG. 4 is an equivalent circuit diagram of the antenna device 101, including the feed circuit as well. A resonance circuit on the feed-circuit side preferably includes the first coil L21 and the capacitor C4. An inductor L23 in FIG. 4 represents the inductance of the opening 14A that defines the loop, and a resonance circuit on the radiation-element side preferably includes the inductor L23 together with the second coil L22 and the capacitor C3. By setting each of resonance frequencies of the two resonance circuits to be matched with a frequency band of a communication frequency (i.e., a carrier frequency), a degree of coupling between the resonance circuit on the feed-circuit side and the resonance circuit on the radiation-element side is increased, and radiation efficiency is increased.

Given that the inductance of the second coil L22 is denoted by L22 and the inductance of the inductor L23 is denoted by L23, the above-described equivalent circuit is preferably designed so as to satisfy L22<L23. By satisfying such a condition, an amount of magnetic field radiated from the opening 14A, which acts as the radiation portion, is increased. Furthermore, by providing the coupling portion inside a magnetic body defining the feed element 36, a variation in the coupling degree is reduced. Moreover, by integrally forming the coupling portion and the feed element 36 inside the magnetic body, a higher coupling degree is obtained, and the size of the feed element 36 is reduced. In the case of using a magnetic body that exhibits a larger material loss in a high-frequency range of UHF-band, a large influence is generated upon a UHF-band antenna in which antenna characteristics are obtained with a casing current, like a main antenna. However, such an influence is significantly reduced or prevented when the size of the magnetic body can be reduced as in this preferred embodiment. In addition, a ferrite member or the like to reduce or prevent undesired radiation of the magnetic field to the outside from the feed element 36 is no longer required, and flexibility in layout of the feed element 36 is increased with no need of considering the positional relation with respect to another high-frequency antenna (cellular antenna) or the first connecting portion 21 described in the first preferred embodiment, etc.

The following advantageous effects are obtained by providing the feed element 36 having the transformer-coupled structure described above in the first preferred embodiment.

Since the first coil L21 is provided on the magnetic layer made of ferrite, for example, the first coil L21 is less affected by the surroundings. In other words, since undesired coupling to an external circuit is less apt to occur, the undesired radiation of the magnetic field is significantly reduced or prevented and the interference from the external circuit is also significantly reduced or prevented.

Since the resonance circuits are provided on both the primary and secondary sides of the transformer and two resonance frequencies are generated, a wider frequency band is realized.

Since the primary and secondary sides of the transformer are isolated from each other, high ESD resistance is obtained.

Second Preferred Embodiment

Figure 5:
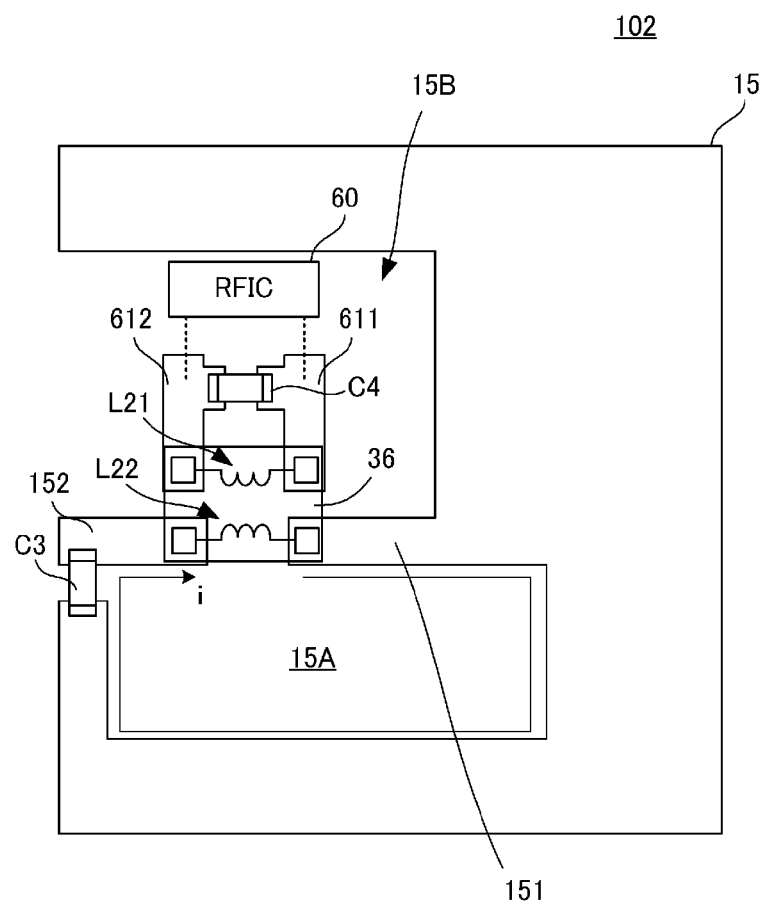
FIG. 5 is a plan view of an antenna device 102 according to a second preferred embodiment of the present invention.

FIG. 5 is a plan view of an antenna device 102 according to a second preferred embodiment of the present invention. In the antenna device 102, two openings 15A and 15B, each being not closed and having an open edge portion, are provided on a conductor surface 15. Between the openings 15A and 15B, there are provided a first mounting portion 151 to which the first end of the second coil L22 of the feed element 36 is connected, and a second mounting portion 152 to which the second end of the second coil L22 is connected. The first mounting portion 151 is connected to the conductor surface 15 directly or indirectly (through, e.g., a capacitor). The first mounting portion 151 may be integral with the conductor surface 15, or may be a member that is separate from the conductor surface 15 and that is connected to the conductor surface 15.

The second mounting portion 152 is isolated from both the first mounting portion 151 and the conductor surface 15. The capacitor C3 is connected between the second mounting portion 152 and the conductor surface 15. Furthermore, the second coil L22 is connected between the second mounting portion 152 and the first mounting portion 151. Thus, a peripheral edge of the opening 15A constitutes a loop because two open edge portions of the opening 15A are closed by the capacitor C3 and the second coil L22. An inductance component of the loop, the capacitor C3, and the second coil L22 define a resonance circuit.

The feed-circuit side mounting portions 611 and 612 are disposed in the opening 15B, and the capacitor C4 is connected to the feed-circuit side mounting portions 611 and 612. The first end and the second end of the first coil L21 of the feed element 36 are connected to the feed-circuit side mounting portions 611 and 612, respectively. While the feed circuit is preferably provided in the opening 14A, which acts as the radiation portion, in the antenna device 101 illustrated in FIG. 1, the feed circuit is provided in the opening 15A, which is different from the opening 15A acting as the radiation portion, in the antenna device 102 of this preferred embodiment, the radiation efficiency is increased.

Third Preferred Embodiment

Figure 6:
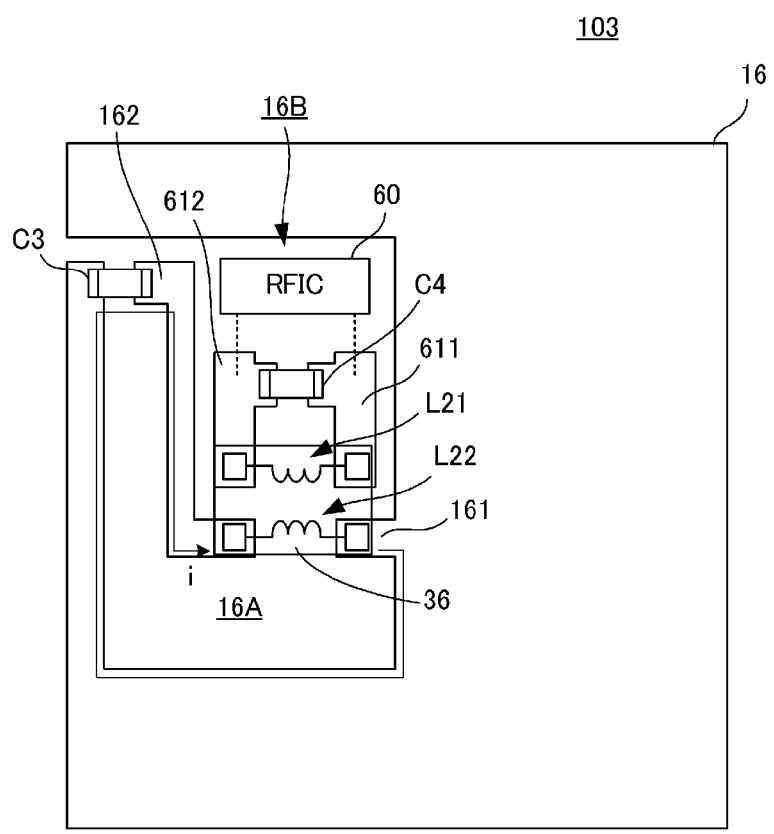
FIG. 6 is a plan view of an antenna device 103 according to a third preferred embodiment of the present invention.

FIG. 6 is a plan view of an antenna device 103 according to a third preferred embodiment of the present invention. In the antenna device 103, two openings 16A and 16B are formed in a conductor surface 16 as in the case illustrated in FIG. 5. Between the openings 16A and 16B, there are provided a first mounting portion 161 to which the first end of the second coil L22 of the feed element 36 is connected, and a second mounting portion 162 to which the second end of the second coil L22 is connected. The first mounting portion 161 is directly or indirectly connected to the conductor surface 16. The capacitor C3 is connected between the second mounting portion 162 and the conductor surface 16.

Furthermore, in this preferred embodiment, the opening 16A is configured to extend from a portion of a rectangular or substantially rectangular shape in one direction and to have an L-shape or substantially an L-shape. Such a shape contributes to providing not only the advantageous effects of the above-described antenna device 102 illustrated in FIG. 5, but also the advantageous effect of enlarging a radiation range of the magnetic field because the magnetic field is radiated from the extended portion as well.

Fourth Preferred Embodiment

While, in the first to third preferred embodiments, the capacitor C3 in the form of a discrete component is mounted on the conductor surface to constitute the resonance circuit, a feed element incorporates a capacitor in a fourth preferred embodiment of the present invention.

Figure 7:
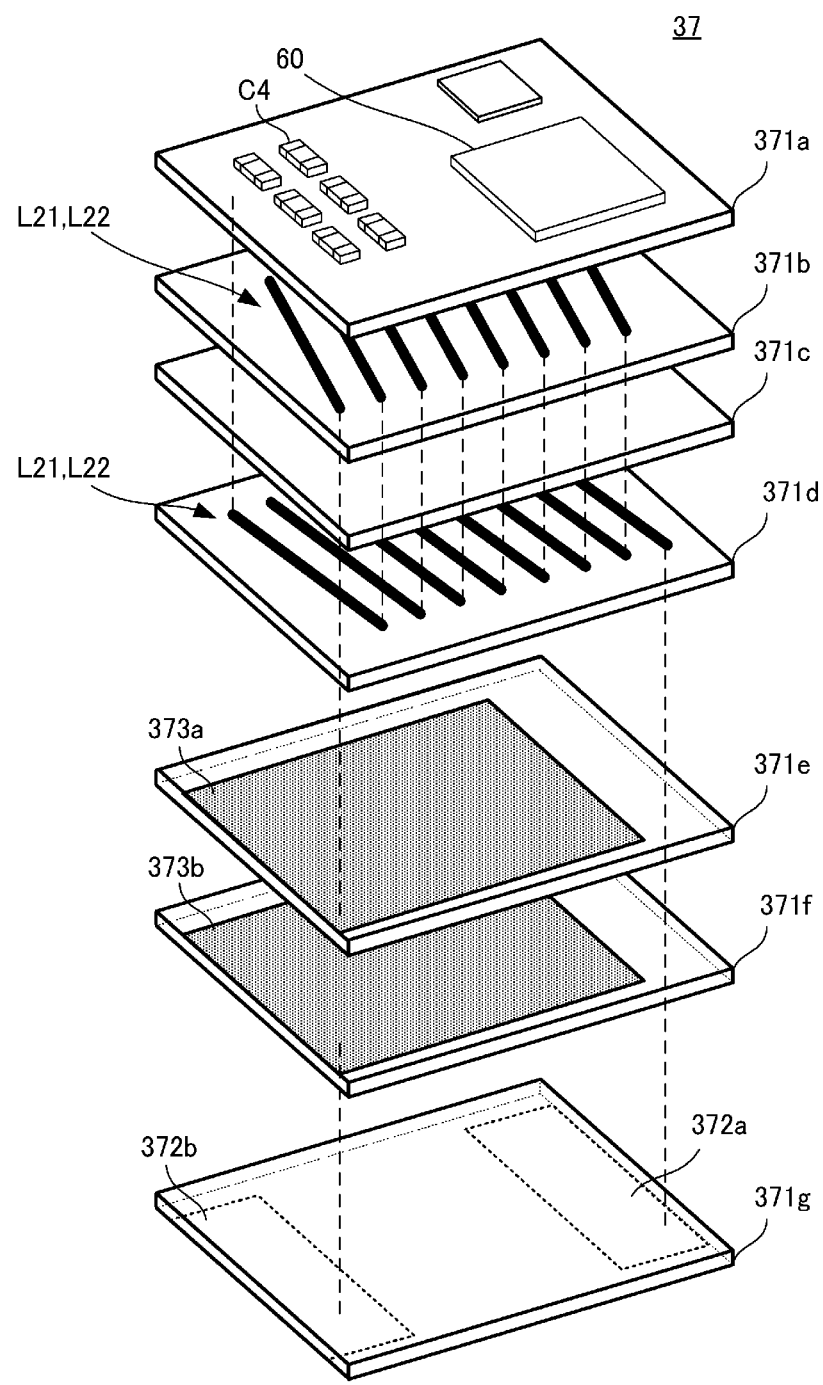
FIG. 7 is an exploded perspective view of a feed element 37 according to a fourth preferred embodiment of the present invention.

FIG. 7 is an exploded perspective view of a feed element 37 according to the fourth preferred embodiment. The feed element 37 has a stacked structure including a plurality of insulator layers 371a to 371g. In more detail, the insulator layers 371b and 371c are magnetic layers, and the other insulator layers are nonmagnetic layers. As in the case described above with reference to FIG. 2, respective conductor patterns defining the first coil L21 and the second coil L22 are provided on the insulator layer 371b and 371d, which are positioned midway in the direction of stacking of the insulator layers. Various elements constituting the feed-circuit side matching circuit, including the RFIC 60 and the capacitor C4, are mounted on the insulator layer 371a that is an uppermost layer in the direction of the stacking. The first end and the second end of the first coil L21 are connected to the matching circuit.

A flat-plate conductor pattern 373a is provided on the insulator layer 371e and a flat-plate conductor pattern 373b is provided on the insulator layer 371f, the insulator layers 371e and 371f being positioned successively under the insulator layer on which the first coil L21 and the second coil L22 are provided. The flat-plate conductor patterns 373a and 373b constitute a capacitor. Furthermore, terminal conductor patterns 372a and 372b defining and serving as external terminals are provided on the lowermost insulator layer 371g. The first end of the second coil L22 is connected to the flat-plate conductor pattern 373a through a via conductor, for example, and the flat-plate conductor pattern 373b is connected to the terminal conductor pattern 372b. In addition, the second end of the second coil L22 is connected to the terminal conductor pattern 372a.

Figure 8:
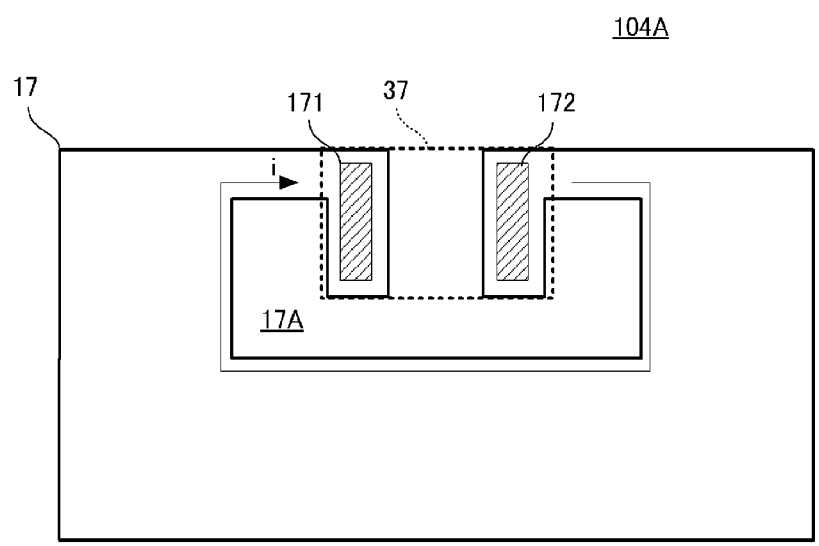
FIG. 8 is a plan view of an antenna device 104A incorporating the feed element 37 illustrated in FIG. 7.

FIG. 8 is a plan view of an antenna device 104A incorporating the feed element 37 illustrated in FIG. 7. The antenna device 104A includes a conductor surface 17. An opening 17A, having a partly opened edge portion, is provided in the conductor surface 17. On both sides of the open edge portion, there are disposed, on the conductor surface 17, a first mounting portion 171 to which the terminal conductor pattern 372a of the feed element 37 is connected, and a second mounting portion 172 to which the terminal conductor pattern 372b of the feed element 37 is connected.

The feed element 37 incorporates a capacitor. By mounting the feed element 37 on the conductor surface 17, therefore, a resonance circuit is constituted by the capacitor in the feed element 37 and inductances of both the second coil L22 and the opening 17A. In other words, a capacitor in the form of a discrete component included in the resonance circuit is not required to be disposed on the conductor surface 17. Moreover, since the RFIC 60, the capacitor C4, etc. preferably are formed integrally with the feed element 37, an installation space for the matching circuit is also not required. It is hence possible to realize reduction in the number of components and saving of a space that is necessary as a mounting region.

Figure 9:
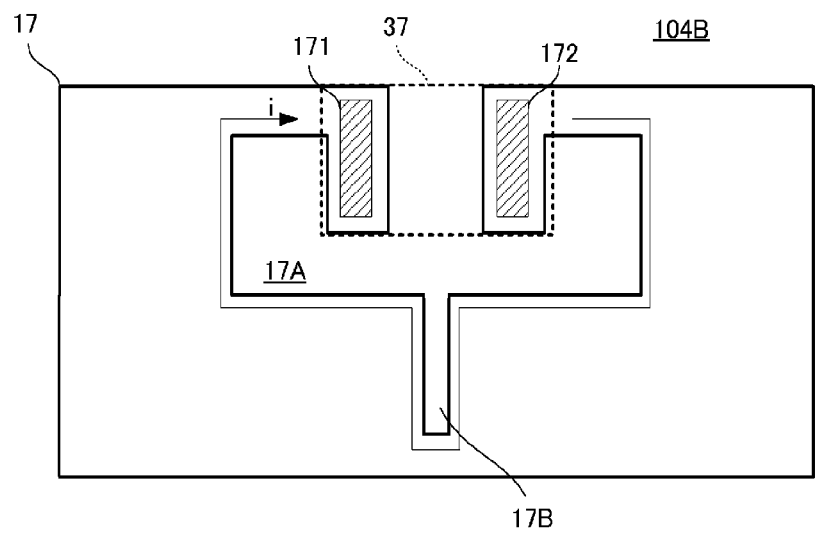
FIG. 9 is a plan view of an antenna device 104B different from the antenna device illustrated in FIG. 8.

FIG. 9 is a plan view of an antenna device 104B different from the antenna device illustrated in FIG. 8. In the antenna device 104B, a slit 17B communicating with the opening 17A is further provided in the conductor surface 17. By forming the slit 17B, the magnetic field is radiated from the slit 17B as well, and a peak position of the radiation of the magnetic field is shifted to a direction in which the slit 17B extends (namely, a directivity center of the radiation of the magnetic field is inclined to the direction in which the slit 17B extends). A position of the slit 17B is not limited to the position illustrated in FIG. 9, and the slit 17B may extend in a direction in which directivity is to be widened. The number of slits can be changed as appropriate.

Fifth Preferred Embodiment

Figure 10:
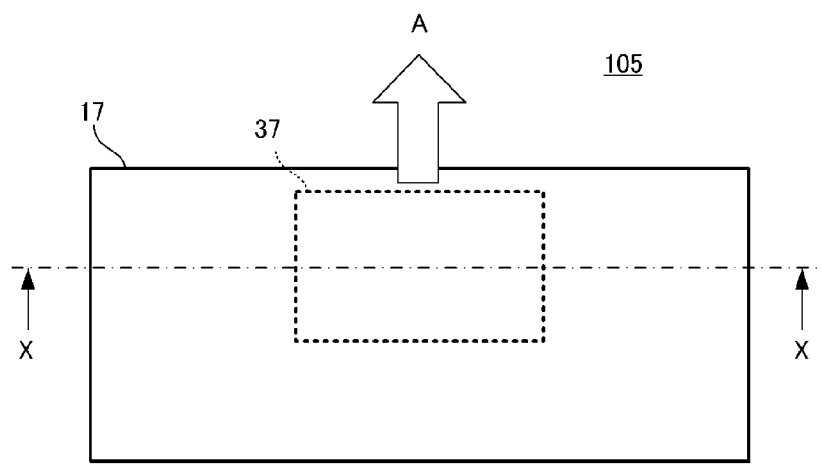
FIG. 10 is a plan view of an antenna device 105 according to a fifth preferred embodiment of the present invention.
Figure 11:
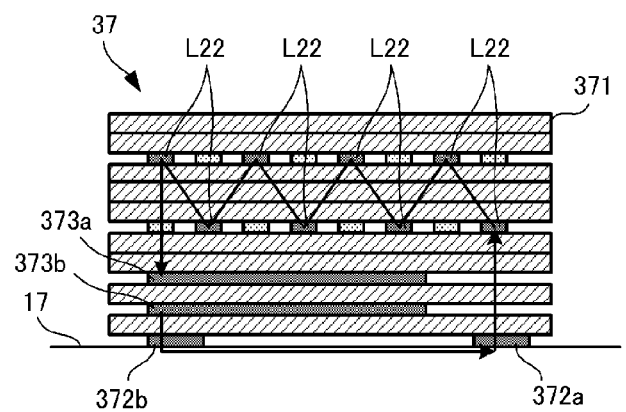
FIG. 11 is a sectional view taken along a line X-X in FIG. 10.

FIG. 10 is a plan view of an antenna device 105 according to a fifth preferred embodiment of the present invention. FIG. 11 is a sectional view taken along a line X-X in FIG. 10. In the antenna device 105 of this preferred embodiment, no openings are provided in the conductor surface 17, and the feed element 37 is mounted on the conductor surface 17 at any desired position. In this preferred embodiment, when looking at a section of the feed element 37, as denoted by a bold-line arrow in FIG. 11, an opening is defined by a path passing the terminal conductor pattern 372b, the capacitor defined by the terminal conductor patterns 373a and 373b, the second coil L22, the terminal conductor pattern 372a, and the conductor surface 17. That opening acts as the radiation portion. Stated in another way, in the configuration of this preferred embodiment, an opening (loop) denoted by the arrow in FIG. 11 is defined by the second coil of the feed element 37 and the conductor surface when looking from a direction facing a longitudinal lateral surface of the feed element 37 (i.e., when looking at the feed element 37 in a direction perpendicular to the direction of the stacking), and that opening acts as the radiation portion. Thus, a radiation element is obtained just by mounting the feed element onto the conductor surface. With the arrangement described above, the antenna device 105 has directivity in the direction of an arrow A in FIG. 10.

Sixth Preferred Embodiment

Figure 12A:
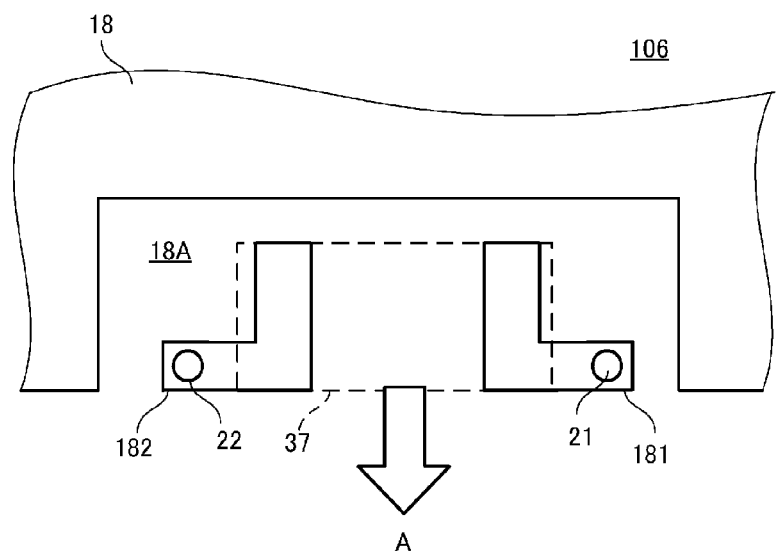
FIG. 12A is a top plan view of an antenna device 106 according to a sixth preferred embodiment of the present invention.

In a sixth preferred embodiment of the present invention, the feed element 37 illustrated in FIG. 7 is preferably included, and an opening acting as the radiation portion is provided by two conductor surfaces. FIG. 12A is a top plan view of an antenna device 106 according to the sixth preferred embodiment, and FIG. 12B is a sectional view.

The antenna device 106 includes a conductor surface 18 in which an opening 18A is provided. A first mounting portion 181 and a second mounting portion 182, both isolated from the conductor surface 18, are provided in the opening 18A of the conductor surface 18. The terminal conductor pattern 372a of the feed element 37 is connected to the first mounting portion 181, and the terminal conductor pattern 372b of the feed element 37 is connected to the second mounting portion 182.

The antenna device 106 further includes a conductor surface 19 arranged opposite to the conductor surface 18. The conductor surface 19 is, for example, a portion of a metallic casing. The conductor surface 19 is connected to the first mounting portion 181 and the second mounting portion 182 through a first connecting portion 21 and a second connecting portion 22, respectively. The first connecting portion 21 and the second connecting portion 22 are each, for example, a spring connector.

Figure 12B:
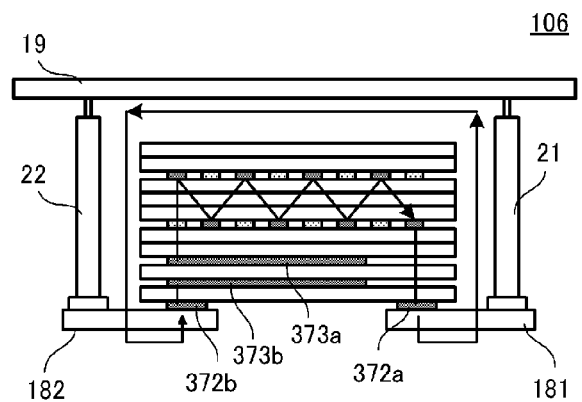
FIG. 12B is a sectional view.

When looking at a section of the feed element 37 having the above-described configuration, as denoted by arrows in FIG. 12B, an opening is defined by a path passing the terminal conductor pattern 372b, the capacitor defined by the flat-plate conductor patterns 373a and 373b, the second coil L22, the terminal conductor pattern 372a, the first connecting portion 21, the conductor surface 19, and the second connecting portion 22. That opening acts as the radiation portion. With the arrangement described above, the antenna device 106 has directivity in the direction of an arrow A in FIG. 12A.

Seventh Preferred Embodiment

Figure 13:
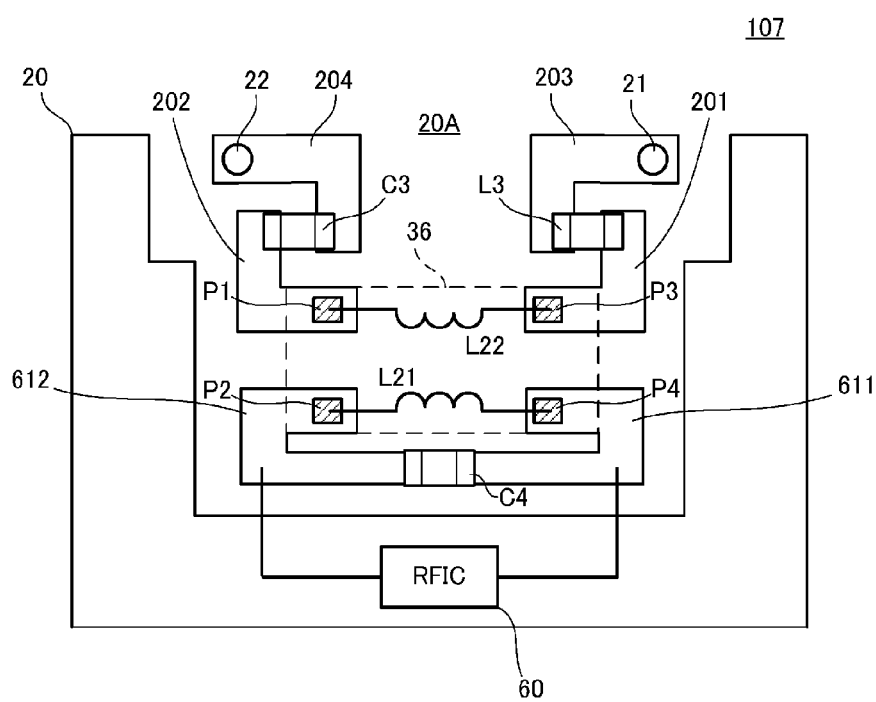
FIG. 13 is a plan view of an antenna device 107 according to a seventh preferred embodiment of the present invention.

FIG. 13 is a plan view of an antenna device 107 according to a seventh preferred embodiment of the present invention. The feed element 36 illustrated in FIG. 2 is preferably included in this preferred embodiment. In the antenna device 107, an opening 20A is provided in a conductor surface 20. A first mounting portion 201 and a second mounting portion 202 are provided in the opening 20A. The first mounting portion 201 is connected to a terminal electrode P3 to which the first end of the second coil L22 of the feed element 36 is connected, and the second mounting portion 202 is connected to a terminal electrode P1 to which the second end of the second coil L22 of the feed element 36 is connected.

Furthermore, a third mounting portion 203 and a fourth mounting portion 204 are provided in the opening 20A in an isolated state. A first connecting portion 21 connected to a not-illustrated conductor surface (corresponding to the conductor surface 19 in FIG. 12) is mounted to the third mounting portion 203, and a second connecting portion 22 connected to the not-illustrated conductor surface (corresponding to the conductor surface 19 in FIG. 12) is mounted to the fourth mounting portion 204. An inductor L3 is connected between the first mounting portion 201 and third mounting portion 203. A capacitor C3 is connected between the second mounting portion 202 and fourth mounting portion 204.

Moreover, feed-circuit side mounting portions 611 and 612 to which a terminal electrode P4 connected to the first end of the first coil L21 and a terminal electrode P2 connected to the second end of the first coil L21 are connected, respectively, are disposed in the opening 20A. The RFIC 60 is connected to the feed-circuit side mounting portions 611 and 612.

Thus, even when the feed element 36 does not incorporate the capacitor, the opening acting as the radiation portion can be provided, as in the case of FIG. 12, by mounting the capacitor C3, which is a discrete component, in a region outside the feed element 36. With the capacitor C3 mounted to the region outside the feed element 36, the resonance frequency is adjusted. Furthermore, since an inductance component of the resonance circuit is determined depending on the inductance of the inductor L3, the inductor L3 having a proper inductance can be included, as required, depending on the size and the shape of the conductor surface to which the first connecting portion 21 and the second connecting portion 22 are connected. It is to be noted that a capacitor may be installed instead of the inductor L3.

While, in the preferred embodiments described above, the first coil L21 and the second coil L22 are preferably configured such that a coil winding axis of each coil is oriented perpendicular or substantially perpendicular to the direction in which the insulator layers are stacked, the arrangement of the coils of the feed element is not limited to such an example. As another example, the first coil L21 and the second coil L22 may be configured such that the winding axis of each coil is matched with the direction in which the insulator layers are stacked. As still another example, the first coil L21 and the second coil L22 may be configured such that the second coil L22 is positioned inside a coil aperture of the first coil L21. Furthermore, while FIG. 2, etc. illustrate an example in which the first coil L21 and the second coil L22 are alternately wound, the second coil L22 may be wound outside the first coil L21 in sandwiching relation to the first coil L21. Moreover, in the case of the first coil L21 and the second coil L22 having the same winding axis and the same coil aperture, the coils may be configured by successively arranging some plural turns of the first coil L21, some plural turns of the second coil L22, other plural turns of the first coil L21, and other plural turns of the second coil L22 side by side.

Eighth Preferred Embodiment

Figure 14:
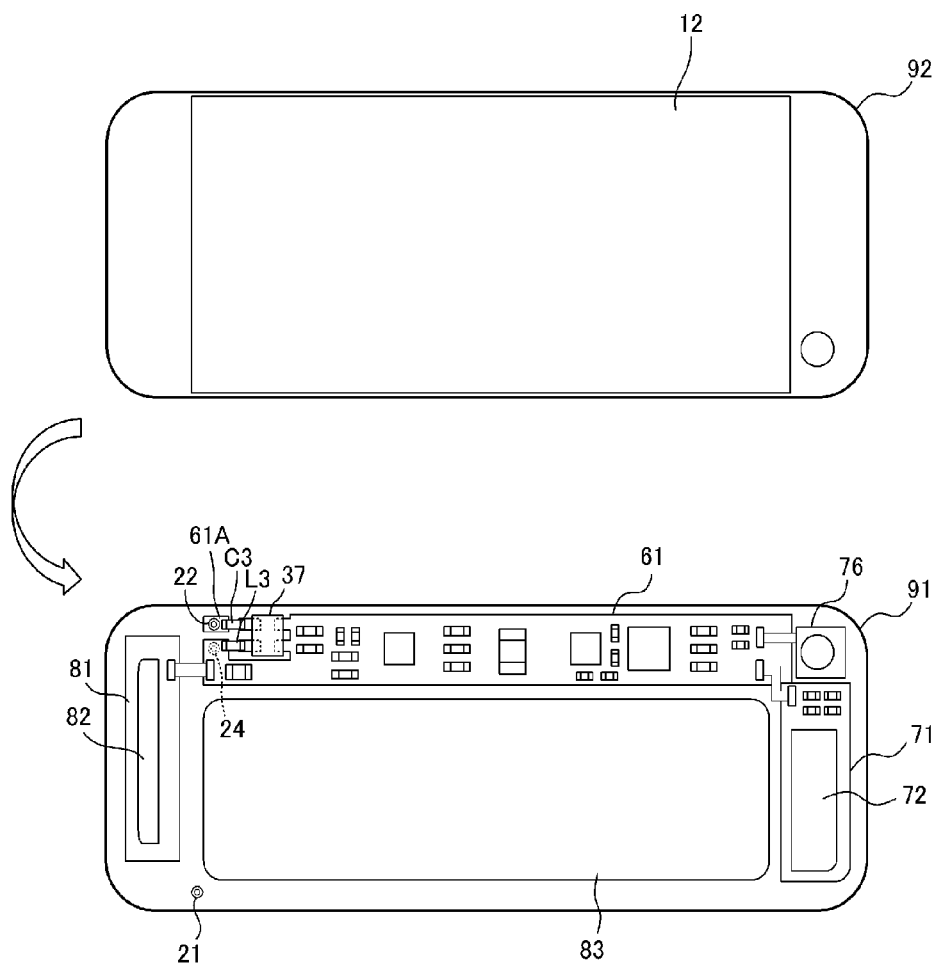
FIG. 14 is a plan view illustrating the structure inside a casing of a communication terminal device according to an eighth preferred embodiment of the present invention.
Figure 15A:
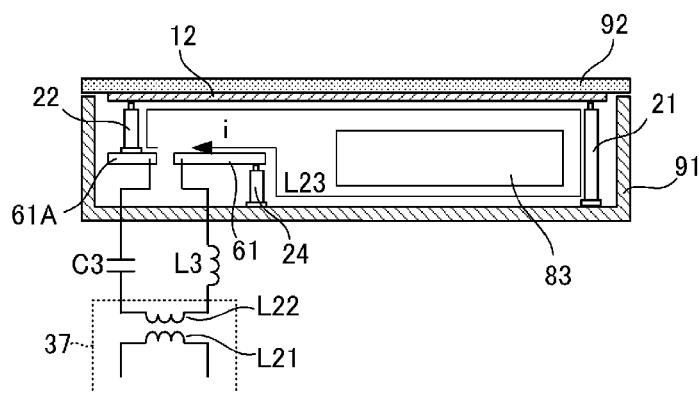
FIG. 15A is a sectional view, taken in a direction along a shorter side, of the communication terminal device illustrated in FIG. 14.
Figure 15B:
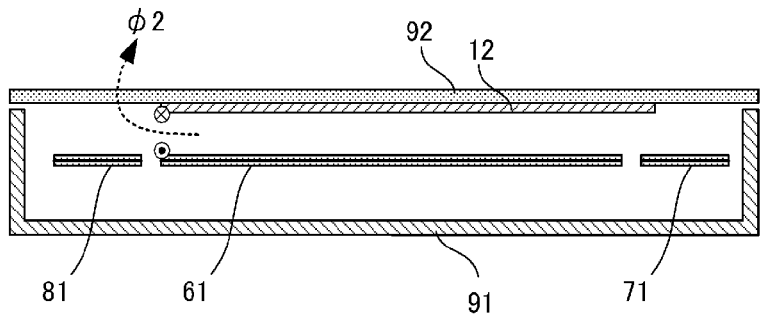
FIG. 15B is a sectional view, taken in a direction along a longer side, of the communication terminal device.

FIG. 14 is a plan view illustrating the structure inside a casing of a communication terminal device according to an eighth preferred embodiment of the present invention. FIG. 15A is a sectional view, taken in a direction along a shorter side, of the communication terminal device illustrated in FIG. 14, and FIG. 15B is a sectional view, taken in a direction along a longer side, of the communication terminal device. In FIGS. 15A and 15B, an upper casing is illustrated as being positioned to face downwards.

Circuit boards 61, 71 and 81, a camera module 76, a battery pack 83, etc. are contained inside an upper casing 91. The RFIC 60 (not illustrated) including the communication circuit, the feed element 36, etc. are mounted on the circuit board 61. A UHF-band antenna 72, etc. are mounted on the circuit board 71. A UHF-band antenna 82, etc. are mounted on the circuit board 81. The circuit boards 61, 71 and 81 are connected to each other via cables.

A ground conductor provided on the circuit board 61 acts as a conductor surface. A cutout is partly formed in the ground conductor on the circuit board 61, and a mounting portion to mount a feed element 37, etc. are disposed in the cutout. The feed element 37 is preferably the same as that described above with reference to FIG. 7. A mounting portion 61A provided with a second connecting portion 22 is also disposed in the cutout. The mounting portion 61A is connected to the ground conductor on the circuit board 61 through a capacitor C3, a second coil L22 of the feed element 37, and an inductor L3.

The upper casing 91 preferably is a metallic casing. The ground conductor of the circuit board 61 is connected to the upper casing 91 through a fourth connecting portion 24.

A lower casing 92 is preferably made of resin, but a conductor surface 12 made of a metal film is provided on an inner surface of the lower casing 92. The second connecting portion 22 provided on the mounting portion 61A is connected to the conductor surface 12. Furthermore, the metal film of the upper casing 91 and the conductor surface 12 are electrically connected to each other through a first connecting portion 21.

With the arrangement described above, as denoted by an arrow in FIG. 15A, a current i flows along a path of the second coil L22 of the feed element→the capacitor C3→the mounting portion 61A→the second connecting portion 22→the conductor surface 12→the first connecting portion 21→the upper casing 91→the fourth connecting portion 24→the ground conductor formed on the circuit board 61→the inductor L3→the second coil L22 in the order named. The above-mentioned path of the current i defines an opening that acts as the radiation portion. As seen from FIG. 15B, magnetic flux φ2 passes through the opening.

An additional element, e.g., a capacitor or an inductor, may be mounted as appropriate midway the path, which defines the opening acting as the radiation portion, in order that an actual resonance frequency is matched with the desired resonance frequency.

Figure 16A:
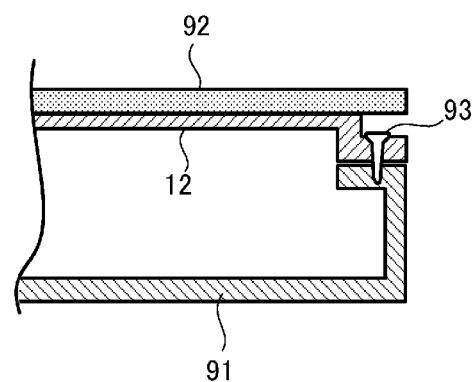
FIGS. 16A and 16B illustrate examples of a structure joining an upper casing and a lower casing to each other.
Figure 16B:
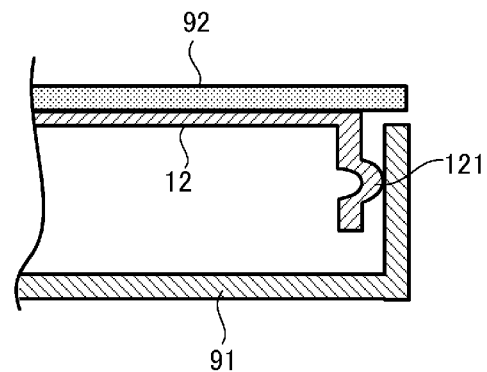

An arrangement to electrically connect the upper casing 91 and the conductor surface 12 provided on the lower casing 92 is not limited to the above-described connection using the second connecting portion 22. FIGS. 16A and 16B illustrate examples of a structure joining the upper casing and the lower casing to each other. In FIGS. 16A and 16B, the upper casing 91 is a metallic casing. As illustrated in FIG. 16A, the metal film defining and serving as the conductor surface 12 may be partly bent and fixed to the upper casing 91 by a screw 93. With such a configuration, the conductor surface 12 and the upper casing 91 are electrically connected to each other. Alternatively, as illustrated in FIG. 16B, the metal film defining and serving as the conductor surface 12 may be partly shaped into the form of a fitting portion 121, and the fitting portion 121 may be fixedly press-fitted to the casing 91. With such a configuration, the conductor surface 12 and the upper casing 91 are electrically connected to each other.

While, in the eighth preferred embodiment, the opening acting as the radiation portion preferably is configured to face in a direction toward a shorter side of the communication terminal device, the opening may be configured to face in a direction toward a longer side of the communication terminal device, or in a direction of a diagonal line of the casing.

Ninth Preferred Embodiment

Figure 17:
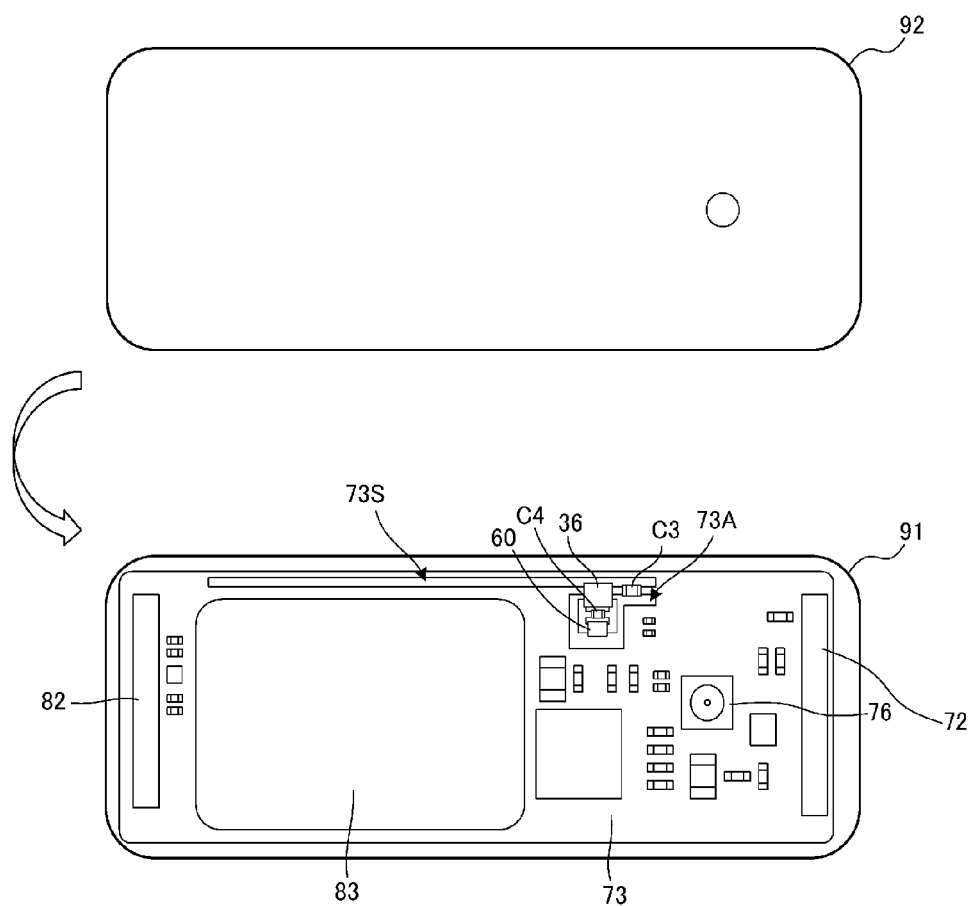
FIG. 17 is a plan view illustrating the structure inside a casing of a communication terminal device according to a ninth preferred embodiment of the present invention.

FIG. 17 is a plan view illustrating the structure inside a casing of a communication terminal device according to a ninth preferred embodiment of the present invention. In this preferred embodiment, the metal film defining and serving as the conductor surface 12 is not provided on the lower casing 92.

A battery pack 83 and a circuit board 73 are disposed on the upper casing 91. UHF-band antennas 72 and 82, a camera module 76, and so on are mounted on the circuit board 73. A slit 73S is provided in a portion of the circuit board 73 where a ground pattern is not provided. Moreover, an opening 73A is located near the slit 73S. As in the case described above with reference to FIG. 6, feed-circuit side mounting portions 611 and 612 are disposed in the opening 73A, and the RFIC 60, the capacitor C4, etc. are mounted on the feed-circuit side mounting portions 611 and 612. The capacitor C3 is disposed between the slit 73S and the opening 73A. In addition, as described above with reference to FIG. 13, for example, other feed-circuit side mounting portions are disposed between the slit 73S and the opening 73A, and the feed element 36 is mounted on those mounting portions.

With the configuration described above, a current flows along the periphery of the slit 73S, and the slit 73S acts as the radiation portion. Thus, when the circuit board 73 has a certain extent of vacant space as in the above-described case, effective space utilization is realized by forming a slit in the vacant space in such a manner that the slit defines and acts as the radiation portion.

It is to be noted that the above-described preferred embodiments are merely illustrative, and that the present invention is not limited to those preferred embodiments. One of the conductor films in the present invention is not limited to a ground conductor provided on the circuit board or a battery pack. Furthermore, one of the conductor surfaces is not limited to a metal portion of the casing. For example, a shield case, a shield plate, an LCD panel, or the like may be utilized as a first conductor surface or a second conductor surface.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An antenna device, comprising:
    a feeder circuit;
    a first coil connected to the feeder circuit;
    a second coil magnetically coupled to the first coil; and
    a housing inside of which the feeder circuit is housed, the housing including a metallic member, the metallic member being connected to the second coil, and the metallic member and the second coil defining a closed loop by the connection of the metallic member to the second coil.

2. The antenna device according to claim 1, wherein the metallic member includes at least a portion of an opening in the housing that functions as a radiation section.

3. The antenna device according to claim 1, further comprising:
    a capacitor connected between the second coil and the metallic member.

4. The antenna device according to claim 1, further comprising:
    an inductor connected between the second coil and the metallic member.

5. The antenna device according to claim 1, wherein the second coil and the metallic member are connected via a connection section.

6. The antenna device according to claim 5, wherein the connection section is a spring connector.

7. The antenna device according to claim 1, wherein the closed loop defines an HF-band antenna.

8. The antenna device according to claim 1, further comprising:
a ground conductor connected between the second coil and the metallic member.

9. A communication terminal apparatus, comprising:
an antenna device;
a feeder circuit; and
a housing; wherein
the antenna device includes:
a first coil connected to the feeder circuit; and
a second coil magnetically coupled to the first coil; and
the feeder circuit is housed inside the housing, the housing includes a metallic member, the metallic member is connected to the second coil, and the metallic member and the second coil define a closed loop by the connection of the metallic member to the second coil.

10. The antenna device according to claim 1, wherein a first end and a second end of the first coil are connected to the feed circuit.

11. The antenna device according to claim 1, wherein a first end and a second end of the first coil are connected to the feed circuit to define a closed circuit loop.

12. The antenna device according to claim 9, wherein a first end and a second end of the first coil are connected to the feed circuit.

13. The antenna device according to claim 9, wherein a first end and a second end of the first coil are connected to the feed circuit to define a closed circuit loop.

* * * * *